Oct. 29, 1968    T. A. ROSBOTTOM    3,407,911
POWER TRANSMISSION SYSTEMS
Filed July 22, 1966    4 Sheets-Sheet 1
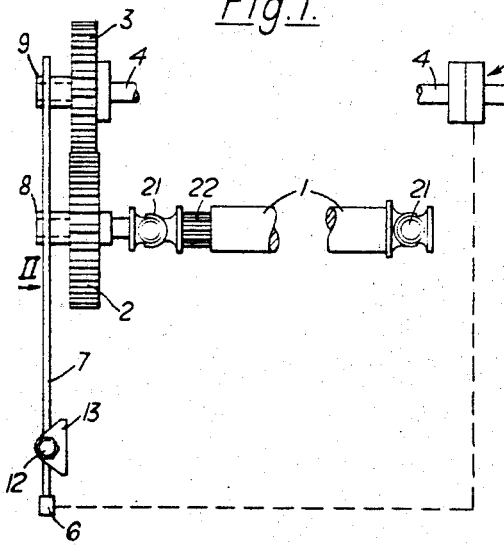
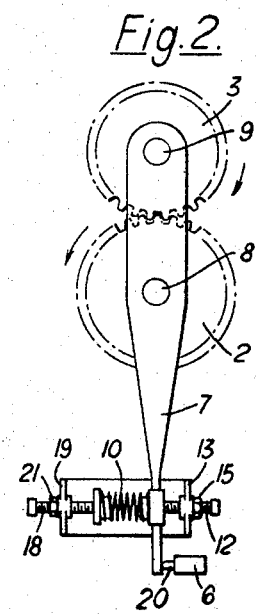
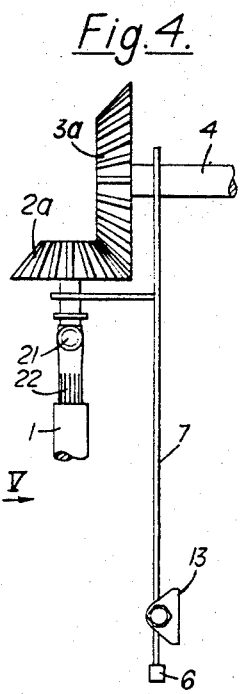
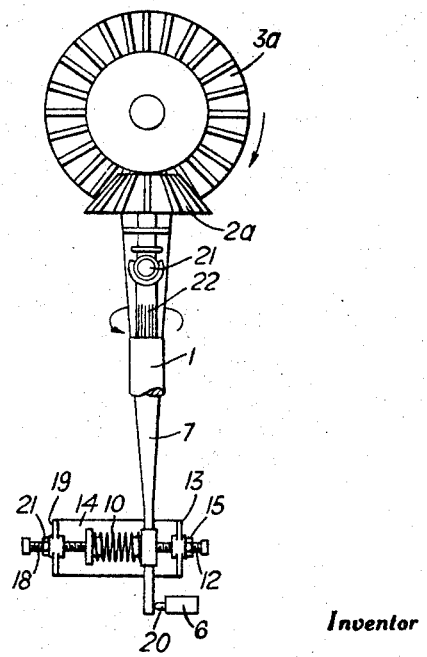
Inventor
Thomas Albert Rosbottom
By
Mason, Porter, Diller & Brown
Attorneys

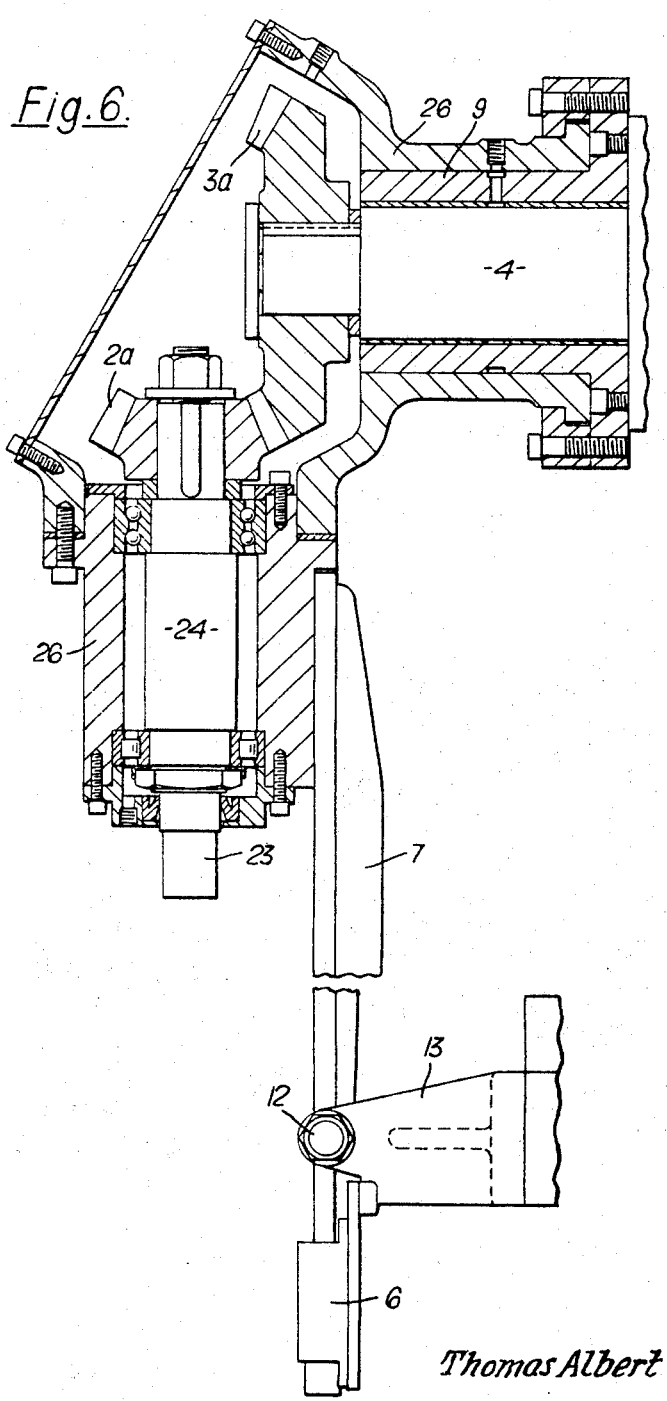

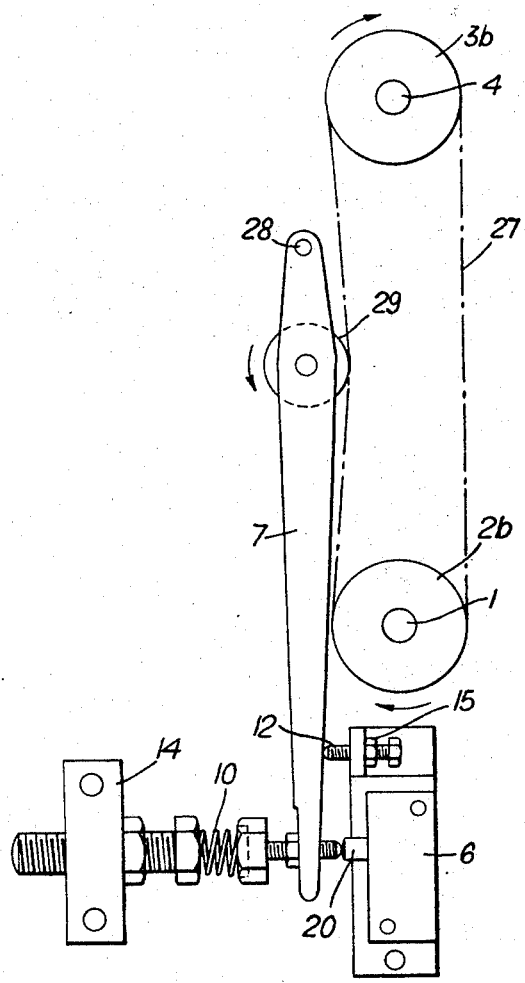

United States Patent Office 3,407,911
Patented Oct. 29, 1968

3,407,911
POWER TRANSMISSION SYSTEMS
Thomas Albert Rosbottom, Hayes, England, assignor to The Metal Box Company Limited, London, England, a British company
Filed July 22, 1966, Ser. No. 567,237
Claims priority, application Great Britain, Aug. 3, 1965, 33,213/65
13 Claims. (Cl. 192—56)

ABSTRACT OF THE DISCLOSURE

A power transmission system providing overload protection is disclosed herein. A driving gear is provided in meshing engagement with a driven gear and the driven gear is mounted upon a mounting member which is pivotable about the axis of the driving gear. The driven gear is coupled with a load and upon overloading of the system, the driven gear and mounting member are displaced as a result of the rotation of the driving gear. A control device is provided in cooperation with the mounting member to control power transmission in response to pivoting of the mounting member. Flexible coupling provisions couple the driven gear with the load to maintain the interconnection thereof upon displacement of the driven gear.

---

Figure 3:
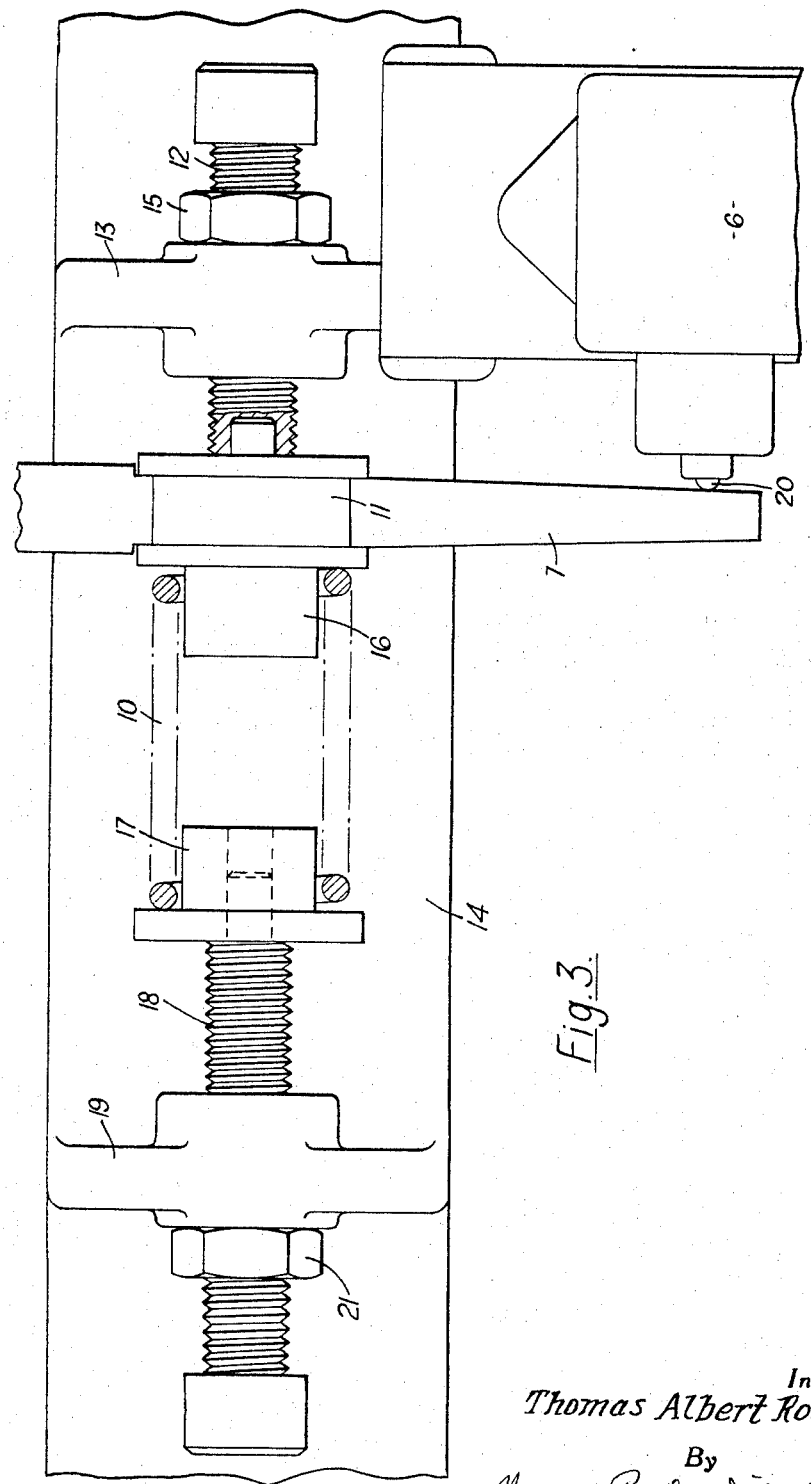

This invention relates to power transmission systems provided with means to prevent damage when the system becomes overloaded.

Many machines are provided with devices such as shear pins incorporated in the driving mechanism therefor so that on overloading the pins break before major damage is inflicted on the power transmission system. However, many of such devices are unsatisfactory because the machine must be dismantled to replace them, thus resulting in the expenditure of time and money to effect the repairs and the loss of production time of the machine.

It is a main object of the present invention to avoid such losses by providing a power transmission system with an overload relief device which is operable to terminate the supply of power.

According to one aspect thereof the invention contemplates a power transmission system provided with an overload relief device, wherein a driven shaft is rotatable by a driven member rotated by driving means through actuating means including a normally operative control device, and a lever supported for pivotal movement is resiliently urged into co-operation with the control device to retain the device in the operative condition thereof and by co-operation with the driving means is arranged on a predetermined overloading of the system to disengage the lever from the control device thereby to interrupt operation of the actuating means.

According to another aspect thereof the invention contemplates a power transmission system provided with an overload relief device, wherein a fully floating driven shaft is rotatable by a driven member rotated by a driving member through actuating means including a normally operative control device, and a lever couples a bearing for the driven member with a bearing for the driving member and is resiliently urged into co-operation with the control device to retain the device in the operative condition thereof, the arrangement being such that a predetermined overloading of the system is operable through the driven member to disengage the lever from the control device thereby to interrupt operation of the actuating means.

In one embodiment of the invention the driving and driven members are spur gears, and in another embodiment they are bevel gears.

In an alternative embodiment of the invention the driven member and the driving means includes a driving sprocket and an endless chain connecting the driving and driven sprockets, and the level carries an abutment member which is engaged with a run of the chain extending between the driving and driven sprockets. The abutment member preferably is a freely rotatable roller.

In preferred embodiments of the invention the lever is resiliently urged into co-operation with the control device by a spring, the loading of which is adjustable. The system may include an adjustable stop to determine the position of engagement of the lever with the control device.

The actuating means may include a clutch, the active condition of which can be maintained or interrupted by the control device. The clutch may be an electromagnetically operated clutch and the control device be a micro-switch included in the electrical circuit of the clutch.

In order that the invention may be clearly understood embodiments thereof will now be described, by way of example, with reference to the accompanying drawings, in which:

FIG. 1 diagrammatically illustrates a power transmission system according to the invention.

FIG. 2 is a view looking in the direction of arrow II, FIG. 1,

FIG. 3 illustrates, to an enlarged scale, a part of the mechanism shown in FIGS. 1 and 2, FIG. 4 is a diagrammatic elevation of an alternative power transmission system according to the invention, FIG. 5 is a view looking in the direction of arrow V, FIG. 4, FIG. 6 is an elevation of a device as diagrammatically shown in FIGS. 4 and 5, and FIG. 7 is a diagrammatic elevation of another alternative power transmission system according to the drawings.

In the drawings like reference numerals refer to like or similar parts.

Referring to FIGS. 1 to 3, a fully floating driven shaft 1 is rotatable by a driven member, shown as a spur gear 2, and a driving member, shown as a spur gear 3 rotatable with a driving shaft 4, through actuating means, such as an electro-pneumatic clutch 5, including a normally operative control device, shown as a micro-switch 6 which is included in the electrical circuit of the clutch. If desired, the spur gears 2, 3 may be replaced by double helical gears, or by single helical gears in which case provision must be made to balance the axial thrust resulting from the loading of the meshing teeth. A lever 7 couples a bearing 8 for the driven member 2 with a bearing 9 for the driving member 3 and is resiliently urged, by a spring 10, into cooperation with the control device 6 to retain the device 6 in the operative condition thereof. The arrangement is such that, as described below, a predetermined overloading of the system is operable through the driven member 2 to disengage the lever 7 from the control device 6 thereby to interrupt operation of the actuating means 5.

As can be seen from FIG. 3, the lever 7 carries a rider 11 which is supported in a hole in a stop screw 12 which is screwed through a wing 13 of a fixed bracket 14 and is provided with a lock-nut 15. The spring 10 is a compression spring and is carired by a spigot 16 on rider 11 and a spigot 17 carried by an adjusting screw 18 which is screwed through a second wing 19 of bracket 14. By adjustment of screw 18 the spring load is adjusted so that the normal working load of the system does not cause the lever 7 to leave the stop screw 12 and so become disengaged from the actuating button 20 of the micro-switch 6. The position of stop 12 is adjusted so that when it is engaged by lever 7 the lever also depresses button 20 to render the micro-switch 6 active, and stop 12 is secured in the adjusted position thereof by the lock-nut 15. The screw 18 is locked in the adjusted position thereof by a lock-nut 21.

When the driving shaft 4 rotates, the gear 3 causes gear 2 to rotate in the opposite direction, the resultant reaction being controlled by the bearings 8, 9. The lever 7 which is attached to the bearings 8, 9 therefore maintains the shafts 1 and 4 the correct distance apart for the gears 2, 3 to mesh properly. When the gears 2, 3 are transmitting the normal working force the back force or reaction due to the load tends to cause the driven gear 2 to be displaced and so to cause the lever 7 to move away from the stop 12. However, as described above, for normal running the spring load is adjusted, by screw 18, to cause lever 7 to remain engaged with stop 12. When the system is overloaded the axis of the gear 2 starts to move about a circle centered on the axis of the driving shaft 4. This causes lever 7 to move away from stop 12, compressing spring 10, and by disengagement from button 20 renders the micro-switch 6 inactive so interrupting the electrical supply by which the clutch 5 is made active. In order that the driven gear 2 be free to move and so actuate lever 7 it is necessary that, as stated above, the driven shaft 1 be fully floating. This may be accomplished in any suitable manner such as by the use of flexible couplings 21 and splines 22 as indicated in FIG. 1.

The embodiment of the invention shown in FIGS. 4 to 6 is similar to that of FIGS. 1 to 3 but differs therefrom in that the spur gears 2, 3 are replaced by bevel gears 2a, 3a. In FIG. 6 the splined driven shaft 1 and the flexible coupling 21 have been omitted but the flexible coupling 21 is connected to the stub 23 of a stub shaft 24 to which the bevel gear 2a is keyed. The stub shaft 24 is rotatable in a housing 26 which is free to rotate about the bearing 9 for the driving shaft 4. Lever 7 is connected to the housing 26.

When, as described above, the driving and driven members are spur or bevel gears it is essential that the driven shaft 1 be fully floating so as to be free to move for a small distance around the axis of the driving shaft 4. This distance can, however, be greatly magnified at the rider 11, FIG. 3, by suitably selecting the length of the lever 7 and it will be understood that by selecting a long lever 7 the force to be withstood by the balance spring 10 can be reduced so that the device becomes more sensitive to overload and so provides greater protection to the machne to which the system is fitted.

If, however, as shown in FIG. 7, the driven member is a chain driven sprocket or the like it is not essential that the driven shaft be fully floating. In the embodiment illustrated diagrammatically in FIG. 7 the driven member is a sprocket wheel 2b, the driving member is a sprocket wheel 3b, and the wheels 2b, 3b are connected by an endless chain 27. The lever 7 is pivoted at 28 to the machine frame, not shown, and carries an abutment, shown as a freely rotatble roller 29, which engages with a run of the chain, as shown in FIG. 7, extending between the driving and driven wheels 3b, 2b. If the load on the system exceeds the predetermined load the chain 27 becomes taut thus rocking the lever 7 clockwise, as viewed in FIG. 7, to disengage the button 20 to render the micro-switch 6 inactive and so interrupt clutch 5, not shown in FIG. 7.

The overload relief device described with reference to the drawings is particularly advantageous when used in conjunction with instantaneous clutch devices such as electro-pneumatic clutches and electromagnetic clutches and brakes. It can, however, be used in conjunction with the electrical circuit of an internal combustion engine, or the compressed air supply to pneumatic devices.

I claim:
1. A power transmission system for preventing the transmission of power upon the occurrence of an overload and comprising power input means for coupling to a rotary power source, said input means including a power input gear rotatable about a fixed axis, a driven gear meshed with said input gear, a driven gear mounting member rotatably mounting said driven gear and pivotally mounted for pivotal movement with said driven gear about said fixed axis, means biasing said mounting member against pivotal movement and to a first position, control means responsive to movement of said mounting member from said fixed position for halting power transmission upon movement of said mounting member, a driven shaft flexibly coupled to said driven gear at one end thereof for movement of said one end upon pivotal displacement of said driven gear and flexible coupling means affixed to the remaining end of said driven shaft for coupling said driven shaft to a load at a fixed position, whereby overloading causes said driven gear, mounting member and one end of said driven shaft to be displaced without displacement of the location at which said flexible coupling is coupled to said load.

2. The power transmission system according to claim 1 wherein said driven shaft comprises a splined first portion and mating spline receiving portion slidably receiving said splined portion to allow extension of said shaft upon displacement of said one end thereof.

3. The power transmission system according to claim 1 wherein said driven shaft is extensible, allowing extension thereof upon movement of said one end thereof.

4. A power transmission system for preventing the transmission of power upon the occurrence of predetermined load conditions and comprising power input means for coupling to a rotary power source, said input means including a power input gear rotatable about a fixed axis, a driven gear in driving relation with said power input gear, a driven gear mounting member rotatably mounting said driven gear, pivotal mounting means supporting said mounting member for pivotal movement with said driven gear, control means responsive to movement of said mounting member for controlling power transmission, output coupling means for coupling rotary motion to a load at a fixed location and means flexibly interconnecting said driven gear and said output coupling means for transmitting rotary motion therebetween and for maintaining the interconnection to said fixed location upon displacement of said driven gear.

5. The power transmission system of claim 4 wherein said output coupling means is located other than coaxially with said power input gear.

6. The power transmission system of claim 4 wherein said means flexibly interconnecting said driven gear and said output coupling means comprises a driven shaft and flexible coupling means interconnecting said shaft and said driven gear at one end of said shaft, said one end of said shaft being displaceable with said driven gear and the remaining end of said shaft being connected to said output coupling means at said fixed location.

7. The power transmission system of claim 6 wherein said driven shaft is extensible, allowing the extension thereof upon movement of said one end with said driven gear.

8. The power transmission unit of claim 4 further comprising means biasing said mounting member to a predetermined position for controlling the amount of load necessary to cause movement of said mounting member to effect actuation of said control means.

9. The power transmission system of claim 8 wherein said means biasing comprises spring means engaging said mounting member and means movably engaging said spring means for controlling the biasing applied to said member by said spring means.

10. The power transmission system of claim 4 wherein said power input and driven gears comprise bevel gears in meshed relationship, said power input gear being mounted upon a power input shaft, said driven gear mounting member comprising angularly disposed portions pivotally mounted upon said power input shaft for pivotal movement about the axis thereof, said driven gear being affixed to and supported upon a supporting shaft, one of said angularly disposed portions comprising supporting shaft accommodating means through which said supporting shaft extends at an angle with respect to said power input shaft.

11. A power transmission system according to claim 4 wherein said power input means includes a clutch connected to said power input gear, said control means comprising means for effecting disengagement of said clutch in response to movement of said driven gear mounting member.

12. The power transmission system of claim 11 wherein said clutch is an electrically operable clutch, said control means comprising switch means in alignment with said driven gear mounting member and actuable thereby for electrically disengaging said clutch upon movement of said driven gear mounting member.

13. A power transmission system for preventing the transmission of power upon the occurrence of predetermined load conditions and comprising power input means for coupling to a rotary power source, said input means including a rotatable power input bevel gear and an input shaft mounting said input gear, a driven bevel gear meshed with said input gear, a driven gear mounting shaft affixed to said driven gear, gear mounting means housing both said input and driven gears, said housing including a mounting portion pivotally supporting said housing about said input shaft and through which said input shaft extends, said housing further including means for supporting said driven gear mounting shaft for movement with said housing upon the pivoting thereof, said driven gear mounting shaft extending through said means for supporting said driven gear shaft from the interior to the exterior of said housing, and control means responsive to movement of said housing for controlling power transmission.

References Cited
UNITED STATES PATENTS

| | | | |
|---|---|---|---|
| 2,106,502 | 1/1938 | Hawkins | 192—150 |
| 2,208,119 | 6/1940 | Chandler | 192—150 |
| 2,554,503 | 5/1951 | Rainey et al. | 192—150 |
| 2,605,946 | 8/1952 | Currivan | 192—150 |
| 2,918,999 | 12/1959 | Eddy | 192—56 |

MARTIN P. SCHWADRON, *Primary Examiner.*

C. M. LEEDOM, *Assistant Examiner.*